United States Patent Office 2,782,089
Patented Feb. 19, 1957

2,782,089

PROCESS OF IMPROVING THE HEAT STABILITY OF POLYTHIOUREA THREADS BY APPLYING AN EPOXY COMPOUND

Lech Rakowski, Harold M. Gordon Williams, and Donald L. Wilson, Coventry, England, assignors to Courtaulds Limited, London, England, a British company No Drawing. Application January 21, 1953,
Serial No. 332,528

Claims priority, application Great Britain
February 25, 1952

13 Claims. (Cl. 8—115.5)

This invention relates to the treatment of artificial threads, fibres, filaments, ribbons and the like, hereinafter generally referred to as threads, and is particularly concerned with the treatment of threads made from synthetic polythioureas.

Proposals have already been made for making polythioureas and for producing threads from them. United States Patent No. 2,313,871 describes a process for the manufacture of polythioureas which comprises heating substantially in stoichiometric proportions a mixture of one or more diamines and a thiourea-forming derivative of thiocarbonic acid, for example carbon disulphide; the linear polythioureas obtained can be wet, dry or melt-spun. British patent specification No. 524,795 describes a process for making condensation products by reacting an anhydride of a thiocarbonic acid, for example carbon disulphide, with an aliphatic diamine, the amino groups of which are separated by a hydrocarbon chain of at least three carbon atoms; the resulting product may then be heated to give a thermoplastic substance which is capable of being drawn out into threads or the like articles. United States Patent No. 2,566,717 describes a process for the production of improved fibre-forming polythioureas by reacting carbon disulphide with an aliphatic diamine, the amino groups of which are separated by a hydrocarbon chain containing at least three carbon atoms, to form an intermediate salt and heating this salt until a fibre-forming thermoplastic polythiourea is obtained, wherein the carbon disulphide is reacted with the diamine in the form of an aqueous emulsion.

The commercial applications of polythiourea threads have been restricted by the fact that the threads are generally dimensionally unstable to heat; thus the threads generally begin to shrink when heated to about 60° centigrade and heating in boiling water for only one minute is sufficient to damage the threads severely.

The object of the present invention is to produce from polythioureas high tenacity threads of improved heat-stability and suitable for use in normal textile processes.

In accordance with the present invention, a process for the production of high tenacity threads comprises extruding a polythiourea into the form of a thread, treating the thread with an epoxy compound to improve its stability to heat and, before, during or after the treatment with the epoxy compound, stretching the thread at least 50 percent at an elevated temperature, that is to say a temperature not less than 45° centigrade. The threads may then be subjected to a further heat treatment either in the relaxed state or under sufficient tension to prevent relaxation of the thread. Such a heat treatment serves to reduce the shrinkage of the thread after the treatment according to the invention.

The treatment of the thread with a liquid epoxy compound may be effected by immersing the thread in a bath of the epoxy compound. When unstretched thread is treated with a liquid compound such as epichlorhydrin the temperature of the bath should not exceed 20° centigrade and temperatures of between 0° and 10° centigrade are preferred. The necessary treatment time for such baths generally exceeds 1 hour and is preferably at least 10 hours. After the treatment the thread may be washed or otherwise treated to remove excess liquid before the stretching is carried out.

The treatment of the thread with the epoxy compound may also be effected by immersing the thread in a solution of the epoxy compound, preferably in an inert solvent such as toluene. The use of such a solution is desirable where the filaments of the thread might otherwise have a tendency to stick together. The solutions of the epoxy compounds may be used at elevated temperatures and in this way the treatment time may be reduced for example to ½ an hour to 1 hour.

The stretching of the thread after the treatment with the epoxy compound may be effected by passing the thread through a suitably heated fluid medium such as a hot water bath by means of godets, rollers or other known devices driven at preselected speeds to give the desired degree of stretching.

When stretching is carried out before the treatment with the epoxy compound, such treatment with the epoxy compound may be carried out at an elevated temperature, for example at 50° centigrade.

Examples of suitable epoxy compounds for use in the invention are epichlorhydrin, ethylene oxide, propylene oxide and glycidol.

The heat treatment may be effected by heating the dry threads, for example in air, without allowing them to contract freely. The threads may be wound on to a former or may be treated in the form of a wound package. A heat treatment generally serves to reduce the heat shrinkage of the thread still further and then on first treating the thread with hot or boiling water the thread usually undergoes a slight shrinkage but is afterwards substantially dimensionally stable to heat. The steps of heating and shrinkage in the presence of an aqueous medium may be combined into a single operation by heating the thread in a relaxed state in an aqueous medium; the product of such a wet heat treatment is substantially dimensionally stable to heat. The step of shrinking a dry-heated thread may be effected after the thread has been knitted or woven into fabric. Such fabrics after shrinkage are dimensionally stable in hot water and boiling water and can be satisfactorily ironed at the temperatures normally used for natural silk.

The invention is illustrated by the following examples.

Example 1

A polythiourea thread in hank form produced by melt-spinning the product of Example 1 of Patent No. 2,566,717 was immersed in a bath of epichlorhydrin at 10° centigrade for 16 hours. The hank was then removed from the bath, allowed to drain and exposed to the air to allow excess epichlorhydrin to evaporate. The thread was then stretched 200 percent between two godets the second of which was rotating at three times the speed of the first, the stretching being effected in a water bath at 58° centigrade. The thread was then dried.

The thread which had a high sheen had the following properties:

Tenacity _____grams/denier__ 2.47
Extensibility _____percent__ 26.3
Shrinkage in boiling water_____do____ 15

The original untreated thread when dropped into boiling water immediately shrivelled up to a solid non-fibrous mass.

Example 2

A sample of the thread produced as described in Example 1 was wound on to a former and heated in air at 100° centigrade for 24 hours. The shrinkage in boiling water was thereby reduced to 6 percent.

Example 3

A further sample of the thread produced as described in Example 1 was immersed in the form of a hank for 10 minutes in boiling water and then dried in air. The properties of the dry thread were as follows:

| | | |
|---|---|---|
| Tenacity | grams/denier | 2.48 |
| Extensibility | percent | 20.9 |
| Shrinkage in boiling water | do | less than 1 |

Example 4

A hank of a polythiourea thread of the type used in Example 1 was immersed for 19 hours in a solution consisting of 1 volume of epichlorhydrin and 3 volumes of toluene at 40° centigrade. The thread was then drained, dried by exposure to air at room temperature and stretched between godets by 243 percent in water at 70° centigrade. The resultant thread had a tenacity of 2.35 grams/denier and extensibility 20.2 percent; after boiling in water on a metal reel and drying at 100° centigrade the thread shrank 9 percent on immersion in boiling water for 5 minutes.

Example 5

A skein of a polythiourea thread having a denier of 270 and tenacity of 0.7 gram/denier was immersed for 16 hours in epichlorhydrin at a temperature of 10° centigrade. It was then washed in water at room temperature for 2 hours, and dried in air at 60° centigrade. The denier was then 296. The thread was then stretched by 200 percent in water at 70° centigrade and wound on to a metal reel. The package of thread was immersed in boiling water for five minutes and then dried at 100° centigrade.

The thread so obtained had a tenacity of 2.8 grams per denier and an extensibility of 22 percent. When freely suspended in boiling water for five minutes it shrank by 2 percent.

Example 6

Polythiourea thread having a denier of 241 and tenacity of 0.7 gram/denier was stretched by 448 percent in water at 59° centigrade and dried. The stretched thread was wound on to a bobbin and immersed in epichlorhydrin at 14° centigrade for 16 hours, after which it was allowed to dry, heated in boiling water for 5 minutes and dried at 100° centigrade.

A sample of the thread after the treatment with epichlorhydrin, when freely suspended in boiling water for five minutes, shrank by 6 percent of its length. A sample of the final product, similarly tested, shrank by less than 1 percent.

Example 7

Polythiourea thread was treated as described in Example 6 except that propylene oxide was used instead of epichlorhydrin.

The shrinkage of the product in boiling water was 1 percent.

Example 8

Polythiourea thread was treated as described in Example 6 except that the epichlorhydrin bath was at 50° centigrade and the time of immersion was 30 minutes.

The shrinkage of the product in boiling water was 2 percent.

What we claim is:

1. A process for improving the heat stability of a thread of a polythiourea obtained by condensing carbon disulphide with an aliphatic diamine, the amino groups of which are separated by a hydrocarbon chain containing at least three carbon atoms which comprises stretching said thread at least 50% at an elevated temperature not less than about 45° C. and immersing the thread in a bath having a temperature of from about 0° C. to about 50° C. and comprising from about 25% to 100% of an epoxy compound selected from the group consisting of epichlorhydrin, ethylene oxide, propylene oxide and glycidol, the remainder of said bath being an inert organic solvent, for a time sufficient to substantially improve the heat stability of said thread.

2. The process claimed in claim 1 wherein the stretching is carried out before the immersion in the bath.

3. The process claimed in claim 1 wherein the stretching is carried out during the immersion in the bath.

4. The process claimed in claim 1 wherein the stretching is carried out subsequent to the immersion in the bath.

5. A process for improving the heat stability of a thread of a polythiourea obtained by condensing carbon disulphide with an aliphatic diamine, the amino groups of which are seperated by a hydrocarbon chain containing at least three carbon atoms, which comprises stretching said thread at least 50% at an elevated temperature not less than about 45° C. and immersing said thread in a bath having a temperature of from about 0° C. to about 50° C. and comprising from about 25% to 100% of an epoxy compound, selected from the group consisting of epichlorhydrin, ethylene oxide, propylene oxide, and glycidol, the remainder of said bath being an inert inorganic solvent, for a time sufficient to improve the heat stability of the thread; and, after said immersion and stretching, reheating said thread at a temperature of about 100° C., without further stretching, for a time sufficient to increase the heat stability of the thread substantially above that obtained by said stretching and immersion steps alone.

6. The process claimed in claim 5 wherein the epoxy compound is a liquid, and the bath consists substantially entirely of the epoxy compound.

7. The process claimed in claim 6 wherein the temperature of the bath is between about 0° C. and about 10° C. and the stretching is carried out subsequent to the immersion in said bath.

8. The process claimed in claim 5 wherein the thread is stretched in water at an elevated temperature not less than about 45° C.

9. The process claimed in claim 5 wherein the epoxy compound is epichlorhydrin.

10. A process for improving the heat stability of a thread of a polythiourea obtained by condensing carbon disulphide with an aliphatic diamine, the amino groups of which are separated by a hydrocarbon chain containing at least three carbon atoms, which comprises stretching said thread at least 50% at an elevated temperature not less than about 45° C. and immersing said thread in a bath having a temperature of from about 0° C. to about 50° C. and comprising from about 25% to 100% of an epoxy compound, selected from the group consisting of epichlorhydrin, ethylene oxide, propylene oxide, and glycidol, the remainder of said bath being an inert inorganic solvent, for a time sufficient to improve the heat stability of the thread; and, after said immersion and stretching, reheating said thread in a relaxed state, in water, at a temperature of about 100° C., for a time sufficient to increase the heat stability of the thread substantially above that obtained by said stretching and immersing steps alone.

11. A process for improving the heat stability of threads of a polythiourea obtained by condensing carbon disulphide with an aliphatic diamine, the amino groups of which are separated by a hydrocarbon chain containing at least three carbon atoms, which comprises stretching said thread at least 50% at an elevated temperature not less than about 45° C., and immersing said thread in a bath having a temperature from about 0° C. to about 50° C. and comprising from about 25% to 100% of an epoxy compound selected from the group consisting of epichlorhydrin ethylene oxide, propylene oxide and glycidol, the remainder of said bath being an inert organic solvent, for a time sufficient to improve the heat stability of the thread; and, after said thread has been so immersed and stretched, reheating the thread in the dry state at a temperature of about 100° C. without further stretching for a time sufficient to increase the heat stability of the thread substantially above that obtained by said stretching and immersing steps alone, and subsequent to said reheating, treating the thread in water at a temperature of about 100° C., until the thread is substantially dimensionally stable to heat.

12. A process for improving the heat stability of threads of a polythiourea obtained by condensing carbon disulphide with an aliphatic diamine, the amino groups of which are separated by a hydrocarbon chain containing at least three carbon atoms, which comprises stretching said thread at least 50% at an elevated temperature not less than about 45° C., and immersing said thread in a bath having a temperature between about 0° C. and about 50° C. and comprising from about 25% to 100% epichlorhydrin, the remainder being an inert organic solvent, for a time sufficient to substantially improve the heat stability of the thread.

13. A process for improving the heat stability of threads of a polythiourea obtained by condensing carbon disulphide with an aliphatic diamine, the amino groups of which are separated by a hydrocarbon chain containing at least three carbon atoms, which comprises stretching said thread at least 50% at an elevated temperature not less than about 45° C. and immersing said thread in a bath having a temperature of from about 0° C. to about 50° C. and comprising from about 25% to 100% epichlorhydrin, the remainder being an inert organic solvent, for a time sufficient to substantially improve the heat stability of the thread; and, after said immersing and stretching, reheating the thread without further stretching, at a temperature of about 100° C. for a time sufficient to increase the heat stability of the thread substantially above that obtained by said stretching and immersing steps alone.

References Cited in the file of this patent
UNITED STATES PATENTS

| 1,863,208 | Schorger | June 14, 1932 |
| 2,109,295 | Lawrie et al. | Feb. 22, 1938 |

FOREIGN PATENTS

| 524,795 | Great Britain | Aug. 14, 1940 |

OTHER REFERENCES

Serial No. 393,282, Hopff et al., (A. P. C.), published April 20, 1943.